United States Patent [19]

Moss

[11] 4,309,198

[45] Jan. 5, 1982

[54] METHOD OF CONVERTING LIQUID AND/OR SOLID FUEL TO A SUBSTANTIALLY INERTS-FREE GAS

[75] Inventor: Gerald Moss, Oxford, England

[73] Assignee: Exxon Research & Engineering Co., Florham Park, N.J.

[21] Appl. No.: 108,380

[22] Filed: Dec. 31, 1979

[30] Foreign Application Priority Data

Jan. 9, 1979 [GB] United Kingdom ............... 00761/79

[51] Int. Cl.³ ............................................. C10J 3/02
[52] U.S. Cl. .................................... 48/197 R; 48/201; 48/210; 48/213; 252/373; 423/244; 423/542
[58] Field of Search ................... 48/202, 197 R, 200, 48/201, 214 A, 210, 213; 252/373; 423/244 A, 542

[56] References Cited

U.S. PATENT DOCUMENTS

| | | | |
|---|---|---|---|
| 2,705,672 | 4/1955 | Gorin | 48/197 R |
| 2,794,725 | 6/1957 | Scharmann | 48/206 |
| 3,115,394 | 12/1963 | Gorin et al. | 48/202 |
| 3,689,240 | 9/1972 | Aldridge et al. | 48/202 |
| 3,708,270 | 1/1973 | Birk et al. | 48/202 |
| 3,770,399 | 11/1973 | Chong | 48/202 |
| 3,807,090 | 4/1974 | Moss | 48/211 |
| 3,870,480 | 3/1975 | Moss | 48/200 |
| 3,929,431 | 12/1975 | Koh et al. | 48/197 R |
| 4,046,523 | 9/1977 | Kalina et al. | 48/202 |
| 4,060,478 | 11/1977 | Lang | 48/197 R |
| 4,069,024 | 1/1978 | Fernandes | 48/202 |
| 4,070,160 | 1/1978 | Cottle | 48/197 |
| 4,132,764 | 1/1979 | Cines et al. | 48/197 R |

FOREIGN PATENT DOCUMENTS

| | | |
|---|---|---|
| 2159491 | 6/1973 | France . |
| 2304661 | 10/1976 | France . |
| 851054 | 10/1960 | United Kingdom . |
| 1448874 | 9/1976 | United Kingdom . |
| 1504688 | 3/1978 | United Kingdom . |

Primary Examiner—S. Leon Bashore
Assistant Examiner—Michael L. Goldman
Attorney, Agent, or Firm—Edward H. Mazer

[57] ABSTRACT

The invention relates to the conversion of fuel (solid and/or liquid) to reducing and/or synthesis gas by contacting the fuel in a fluidized conversion bed (13) with a solid oxygen donor (e.g. CaSO₄) at a fuel conversion temperature (e.g. 850° to 1150° C.) in the presence of at least one gas/vapor phase substance such as $H_2$ and/or $H_2O$ and/or CO and/or $CO_2$ which serves to promote and or mediate the transfer of oxygen from the donor to the fuel and preferably in the absence of non-reactive gases (e.g. $N_2$) whereby the fuel is converted to a reducing and/or synthesis gas product by (inter alia) partial oxidation employing the oxygen of the solid oxygen donor, the latter being reduced (e.g. CaS). The reduced donor is exothermically oxidized in a fluidized oxidation bed (35) by contact with an oxygen-containing gas (e.g. air) and re-used for converting further quantities of fuel. Moieties (e.g. sulfur/sulfur compounds) whose presence is undesirable in the gas product may be removed by a solid moiety-fixing agent (e.g. CaO) in the conversion bed (13). The moiety-fixing properties of the latter are at least partly regenerated in a fluidized regenerator bed (48) by treatment in a suitable regenerating atmosphere, and the regenerated moiety-fixing agent is returned to the conversion bed (13) directly and/or indirectly via the oxidation bed (35).

9 Claims, 1 Drawing Figure

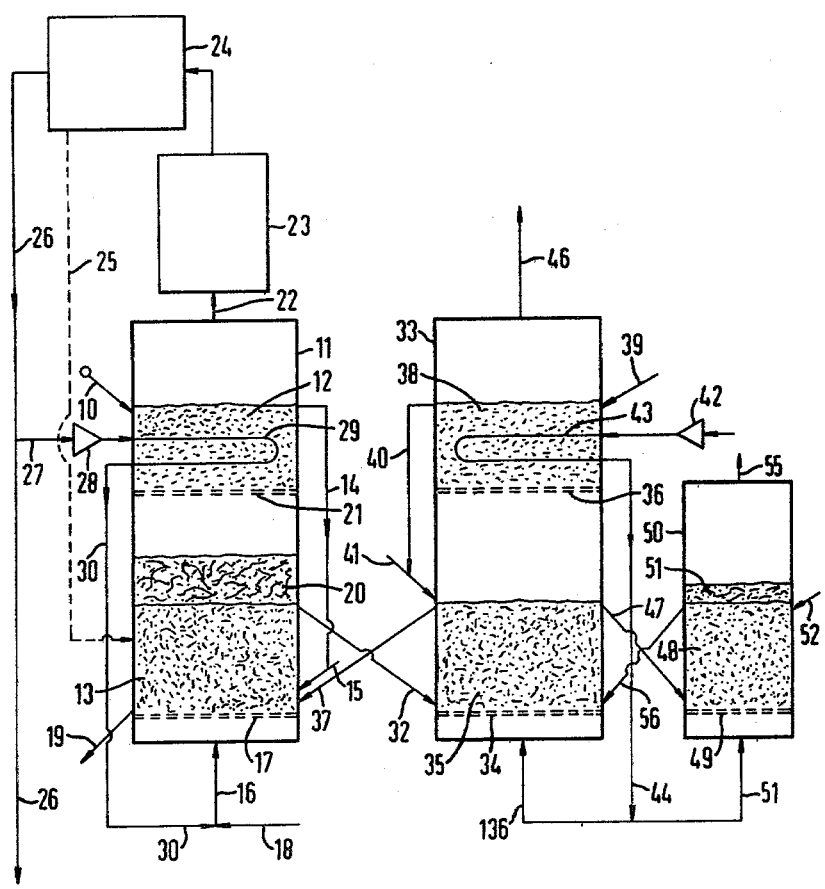

METHOD OF CONVERTING LIQUID AND/OR SOLID FUEL TO A SUBSTANTIALLY INERTS-FREE GAS

The present invention relates to a method of converting liquid and/or solid fuel to a substantially inerts-free gas, and more particularly but not exclusively to the conversion of solid and/or liquid hydrocarbon or carbonaceous (i.e. carbon-containing) fuels (hereinafter referred to as "fuels" for brevity) to reducing gas, useful for the production of heat, power, chemicals and for the reduction of metal oxides.

It is already known to convert fuels to reducing gas by "gasification" using one of the following reactants: (1) a mixture of steam and air or (2) steam and oxygen or (3) steam alone, or (4) hydrogen. The reactions between the fuel and steam (reactant (3)) to produce hydrogen, CO and $CO_2$ is endothermic and heat must be supplied to maintain the reaction temperature. This heat may be generated by burning some of the fuel material with oxygen or air either in the steam gasification zone (i.e. using reactants (2) or (1) respectively) or in a separate zone, but this is inefficient from the point of view of fuel utilization. When air is employed in the steam gasification zone, the reducing gas product contains nitrogen and is of a reduced calorific value per unit volume, and moreover, the size of the gasification equipment and ancilliaries must be larger. The use of oxygen, or oxygen-enriched air increases the capital and operating costs of the gasification plant. A further drawback of known steam gasification processes is that an excess of steam must be employed to promote the reaction between steam and carbon, and that some of the carbon is converted to carbon dioxide. Gasification using hydrogen either alone or as the predominant gasification component is, generally speaking, relatively expensive due to the high cost of hydrogen.

As gasification offers a method of utilizing fuels which otherwise might not be commercially exploitable, gasification is rapidly becoming an increasingly important industrial practice. For this reason, improvements in the efficiency of gasification are highly desirable.

In one aspect of the present invention, liquid and/or solid fuel (as defined above) is converted to a substantially inerts-free reducing and/or synthesis gas (which may contain at least one of the following compounds: CO, $H_2$, $CH_4$) by treating the fuel in a conversion zone under fuel conversion conditions in the presence of a reducible (and preferably reoxidizable) solid oxygen-comprising compound in the presence of a gaseous phase substance which, under the conversion conditions, promotes the transfer of oxygen from the said solid oxygen-comprising compound to the fuel and/or to a partially converted component of the fuel.

The present invention also provides a method of converting liquid hydrocarbon fuel and/or solid fuel to a substantially inerts-free reducing and/or synthesis gas product, the method comprising passing the fuel into a fuel conversion zone comprising a conversion bed of solid particles which are maintained at an elevated fuel conversion temperature and fluidized by a fluidizing gas which is passed into the bottom of the conversion bed and rises upwardly therethrough, the conversion bed comprising particles containing a reducible oxygen-containing solid compound which constitutes substantially the sole source of oxygen used in the conversion of the fuel, the said fluidizing gas comprising at least one gas phase and/or vapour phase substance which serves to promote and/or mediate the transfer of oxygen to the fuel and/or partially converted derivatives thereof from the said reducible oxygen-containing solid compound, which is thereby reduced, and which fluidizing gas is substantially free of (a) molecular oxygen and (b) unreactive and/or inert materials which would dilute the gas product.

The gaseous phase and/or vapour phase substance in the fluidizing gas passed into the bottom of the conversion bed may be selected from hydrogen, a compound (e.g. steam) which serves as a source of hydrogen under the fuel conversion conditions in the bed, at least one oxide of carbon, and a mixture of at least two of the foregoing. The foregoing is not an exhaustive list of suitable substances, but refers to those which are most likely to be readily available at low cost.

Preferably, the reduced solid oxygen-comprising compound is contacted with an oxygen-containing fluid (e.g. gas), such as air which reoxidizes the compound so that it can be reused in the conversion of further quantities of fuel. The reoxidation is preferably performed in an oxidation zone, separate from the conversion zone, to which solids containing the reduced oxygen-comprising compound are transferred. Preferably, the solids in the oxidation bed are fluidized under oxidizing conditions by an upwardly-passing stream of oxygen-containing gas. Solids are transferred from the oxidation zone to the conversion zone at a rate which may be substantially or approximately equal to that at which they are transferred to the oxidation zone from the conversion zone.

The fluidizing of material in the conversion zone may be effected by a stream of reducing gas (preferably including the gaseous phase substance, e.g. hydrogen and/or a hydrogen compound such as steam) produced by the reactions in the conversion zone. Preferably the reducing gas used for such fluidization is treated to remove condensible materials such as tars, oils, etc., and these condensible materials may be either recovered for use or passed back to the conversion zone as a fuel component.

Preferably the fluidizing gas entering the conversion zone is substantially free of gases such as nitrogen which do not take part in the conversion reactions and which would otherwise dilute the volumetric, calorific or chemical feedstock value of the reducing gas.

Many fossil fuels contain chemically combined sulfur and other elements whose presence in the reducing gas, or products resulting from the use thereof, is undesirable. The particulate solids in the conversion zone may comprise solid compounds which are reactive to fix at least one of these elements as solid compounds in the conversion bed. Thus the solids preferably contain a sulfur-reactive solid such as an alkaline earth metal oxide or carbonate, and the solids may also contain solid compounds such as silica and/or alumina for reacting with and fixing other undesirable elements such as vanadium, sodium and nickel in the particulate solids.

Some solids may be subjected to a regeneration treatment, preferably in a regeneration zone, to remove therefrom at least some of the undesirable element(s) which are chemically fixed therein. The solids are transferred to the regeneration zone from the oxidizing zone or from the conversion zone (or from both zones) and treated with a suitable regeneration gas under appropriate regeneration conditions for converting at least some of the chemical compounds of the undesirable elements back to compounds which are active for fixing further amounts of undesirable elements, preferably with the liberation of the undesirable elements in elemental and/or in chemically combined form. Regenerated reactive solids are transferred from the regeneration zone to the conversion zone or to the oxidizing zone or to both zones for re-use. Preferably, the solids in the regeneration zone are fluidized by the regeneration gas (or by a gas which is converted to regeneration gas in the regeneration zone).

In the instance where the undesirable element is sulfur, when solid compounds comprising sulfur are transferred to the regenerating zone from the oxidizing zone, the compounds will additionally comprise oxygen, generally speaking, and the regeneration is preferably effected by fluidizing the solids in a regeneration bed with an oxygen-containing gas (e.g. air), and separately passing into the bed a reducing material such as a hydrocarbon or hydrocarbonaceous fuel (e.g a small portion of the fuel undergoing conversion in the conversion zone) or some of the fuel gas produced in the conversion zone, so that the fuel or fuel gas is non-homogeneously distributed in the bed. The fuel or fuel gas are preferably provided in quantities in excess of that required for complete combustion thereof so that non-homogeneous conditions, including reducing conditions, obtain in the regeneration zone at a suitable regeneration temperature. Sulfur moieties are liberated in the regeneration bed and comprise at least one sulfur oxide which may be recovered, or reduced to elemental sulfur by passage through a bed of reducing solids, such as coke or char, which is arranged to form a fluidized bed layer above the regeneration bed.

When solid compounds comprising sulfur are transferred from the conversion zone to the regeneration zone, the regeneration may be effected by treating the solids containing said solid sulfur compounds in a bed fluidized by an oxygen-containing gas at a suitable regeneration temperature, such that at least some, and preferably most, of the solid sulfur compounds are regenerated to sulfur-reactive solids which are transferred, at least in part, back to the conversion zone for re-use, sulfur moieties being liberated in the regeneration bed mainly as sulfur oxide(s) which can be recovered as such or reduced to elemental sulfur as described above.

Solid compounds containing sulfur may be passed to the regeneration zone in part from the conversion zone and in part from the oxidation zone to effect mutual regeneration, at least in part, under appropriate regeneration conditions.

In preferred embodiments, the oxidizing zone is operated at a higher temperature than the conversion zone, preferably as a desirable result of the exothermic oxidation reactions in the oxidation zone. The solids transferred from the oxidation zone to the conversion zone may thereby supply to the latter at least some, preferably a major part, most preferably substantially all of the heat supplement necessary to maintain the solids in the conversion zone at a temperature in the range suitable for conversion of the fuel to fuel gas.

The regeneration zone preferably operates at a higher temperature than the conversion zone, and solids transferred from the regeneration zone to the conversion zone directly, or indirectly after passage through the oxidation zone, also supplement the heat in the conversion zone, thereby further improving the efficiency of the process of the invention.

Each gas stream leaving a zone used in the process of the invention is substantially at the temperature of the zone, and may be passed through heat recovery devices for heating or preheating at least some of the materials used in the process of the invention or in other processes or equipment (e.g., for heating or preheating one or more of the following: water to produce steam; the oxidizing gas (e.g. air) used in the oxidizing zone; gas or gases used in the regeneration zone, the fuel supplied to the conversion zone; particulate solids supplied for use in the process, preferably passed to the oxidizing zone).

The invention is further illustrated by reference to a non-limitative example thereof and with reference to the accompanying drawing which is a schematic flow diagram of the principal features of one embodiment of equipment for performing the invention, using coal as the fuel. The coal is preferably pulverized to a suitable size for fluidization (referred to below) in the conversion bed, and is fed via line 10 into a vessel 11. The line 10 discharges the coal into a preheat bed 12 where it is heated and devolatilized by the passage through bed 12 of hot reducing gas produced in a conversion bed 13 lower down in the vessel 11. The coal in the preheat bed 12 is preferably fluidized by the upflowing reducing gas, and the temperature in the preheat bed may be about 600° C. Devolatilized coal passes out of bed 12, at a relatively remote region from the coal entry region, and is conducted by conduit 14 downwards for injection into the conversion bed 13. The passage of coal into the bed 13 may be assisted by the injection of a diluent-free gas (e.g. free of $N_2$) such as steam and/or product gas from one or more injector pipes 15 (only one is shown): It is preferred to inject steam to avoid explosion and other possible hazards.

The bed 13 contains particles comprising $CaSO_4$, $CaS$ and $CaO$ (which may be derived from limestone, or, more preferably, from dolomite), coal ash, char (devolatilized coal) and there may also be present, e.g. in the coal ash, minor quantities of silica and alumina and/or compounds thereof.

The bed 13 is fluidized by product gas, from which condensible materials such as tars have been removed by scrubbing, which enters from a conduit 16 and is passed substantially uniformly into the base of the bed by a distributor 17 spaced above the base of the vessel 11. The coal is partially oxidized substantially in the absence of diluent gases at a temperature in the range of e.g. 850° C. to 1150° C., preferably about 950° C., but depending on the pressure of operation, by abstracting oxygen from the $CaSO_4$, which acts as a reducible oxygen-donating compound. The carbon of the coal is oxidized in a manner which can be ascribed to the following apparent empirical reaction:

$$4C + CaSO_4 \rightarrow CaS + 4CO \qquad (1)$$

Some $CO_2$ also may be produced by the empirical reaction:

$$2C + CaSO_4 \rightarrow CaS + 2CO_2 \qquad (2)$$

The relative amounts of CO and $CO_2$ depends on the kinetics of reactions (1) and (2), the temperature and the pressure, which data will be easily determined by those skilled in the art.

In the presence of hydrogen in the product gas which passes into the base of the conversion bed 13, the following empirical reaction is apparently substantially wholly suppressed:

$$CaSO_4 + C \rightarrow CaO + CO + SO_2 \qquad (3)$$

The reason why this reaction is apparently suppressed is thought to be that hydrogen serves as the means for transferring oxygen between the solid oxidizing agent, $CaSO_4$, and the solid reducing agent, carbon, according to the following empirical equations:

$$CaSO_4 + 4H_2 \rightarrow 4H_2O + CaS \qquad (4)$$

$$4H_2O + 4C \rightarrow 4H_2 + 4CO \qquad (5)$$

It will be seen that the hydrogen oxidized in reaction (4) is regenerated in reaction (5) so that the overall effect is that of reaction (1), there being substantially no loss of hydrogen by chemical reaction. A similar type of transfer of oxygen from the sulfate to the carbon in which hydrogen serves as the intermediary to form $CO_2$ according to the gross empirical equation (2) may also take place. The ratio of $CO_2$ to $CO$ in the product gas leaving the conversion zone including the bed 13 will be a function of the bed temperature, pressure and the kinetics of the equilibrium between carbon, carbon monoxide and carbon dioxide and is readily determinable by those skilled in the art. If desired, desirable or necessary, the gases passed into the conversion bed may contain (in relation to prior practice) relatively small amounts of steam, supplied via line 18. The steam provides an additional source of hydrogen and serves to promote the well-known water gas reaction:

$$CO + H_2O \rightarrow CO_2 + H_2 \qquad (6)$$

The bed 13 may contain any of the known materials for catalyzing reaction (6).

Coal usually contains ash and sulfur, and the latter is fixed in the bed material by reaction with the lime, according to the empirical reaction:

$$CaO + (S) \rightarrow CaS \qquad (7)$$

Preferably the bed temperature is kept below the ash fusion temperature, and a bleed of bed solids including ash is discharged via a suitable port 19 in order to avoid an excessive ash accumulation. Unconverted char tends to rise to the top of the bed 13 where it forms a relatively distinct fluidized bed layer 20, and wherein $CO_2$ may be converted to $CO$. The gas leaving the top of layer 20 is substantially free of sulfur and diluents such as nitrogen, and contains $CO$, $CO_2$, $H_2$ and some hydrocarbons (e.g. $CH_4$), depending on the conditions of operation and the presence or absence of materials which catalyze the formation of $CH_4$, etc.

The gas passes via a distributor 21 into the base of the preheat bed 12 where its temperature is reduced to about 600° C. and its composition changed by the addition thereto of coal distillation materials such as moisture, oils, tars, etc. The gas leaving the top of preheat bed 12 passes out of the vessel 11 via conduit 22 to a heat recovery device 23 which may be employed to produce at least some of the steam supplied via line 18, and/or to preheat air and/or solids passing into the equipment. The cooled gas is then passed to a scrubber 24 to remove condensibles, and the latter may either be recovered for use, or circulated to the conversion bed 13, e.g. via broken line 25, for use as additional fuel.

The resulting scrubbed product gas is recovered for use via conduit 26, but some of the gas is recirculated through the vessel 11 for use as a fluidizing medium and also for use as a source of hydrogen. The recirculated gas is withdrawn from conduit 26 via line 27 and circulated by a fan or pump 28 via heating coils 29 immersed in the preheat bed 12 before passing via line 30 to the conduit 16 for entry into the base of the conversion bed 13. Some types of coal may produce relatively fine ash which will be entrained in the gas leaving the conversion vessel 22. To deal with this ash, it may be expedient to provide suitable de-dusting equipment (not shown) such as cyclones. Alternatively, or in addition, some of the ash may be recovered in the scrubber 24 and either removed or returned with the heavy condensibles via line 25 to the conversion bed where some ash agglomeration may occur, and/or the product gas recovered from conduit 26 may be passed through suitable solids-removing equipment such as cyclones, electrostatic precipitators, scrubbers, etc.

In order to maintain the reactivity of the solids in conversion bed 13 both for oxidizing the fuel and for fixing sulfur from the fuel as CaS, it is preferred to subject the solids to appropriate treating steps to regenerate their properties rather than to discard them and replace them with fresh solids. To this end, a conduit 32 provides communication between the vessel 11, at a level just below the top of bed 13 (i.e. preferably below the interface with bed 20) and an oxidizer vessel 33. The latter comprises a gas distributor 34 spaced above the bottom thereof for defining the bottom of an oxidizer bed 35 of solids and for distributing air (or other oxidizing gas) substantially uniformly into the bottom of the bed 35. Solids overflowing or caused to pass from bed 13 through conduit 32 enter bed 35 a short distance (e.g. in the range of from 5 cms to 30 cms) above the distributor 34. The solids entering the bed 35 are substantially free of carbon (or contain only a small proportion thereof) since they have been removed from vessel 11 below the char layer 20, and the main oxidizable component is CaS resulting from the reduction of $CaSO_4$ and the reaction between CaO and sulfur in the fuel under the net reducing conditions in the bed 13.

Air, which is preferably preheated, is passed into the base of the oxidizer bed 35 from conduit 136, fluidizing the solids therein, and the main reaction occuring can be empirically expressed thus:

$$CaS + 2O_2 \rightarrow CaSO_4 \qquad (8)$$

Reaction 8 is strongly exothermic. Preferably excess air is furnished to suppress (as far as possible) the following type of decomposition:

$$2CaS + 3O_2 \rightarrow 2CaO + 2SO_2 \qquad (9)$$

The excess air is also useful as a temperature control medium to prevent the temperature of the bed rising above the preferred temperature range 900° to 1200° C. Other means for controlling the temperature (e.g. immersed heat exchange tubes, not shown) may be employed. Generally speaking, the temperature in bed 35 is controlled to be, in most instances, from 50° to 150° C., preferably about 100° C. higher than that in bed 13.

The oxidized and heated solids are transferred from a top region of the oxidizer bed 35 back to a bottom region of the conversion bed 13 via conduit 37 for re-use therein.

The hot gases leaving the top of oxidizer bed 35 pass via a gas distributor 36 into a heat recovery bed 38. The bed 38 preferably comprises make-up solids to compensate for the losses at the bleed 19 and elsewhere. The make-up solids are supplied via line 39 and may comprise gypsum, anhydrite, lime, limestone, dolomite or any convenient or suitable mixture of at least two of the foregoing. The bed 38 operates at an equilibrium temperature of 750° to 950° C., preferably about 850° C., and preferably contains CaO (lime or calcined dolomite). The lime-containing material may be lime-containing solids circulated from the regenerator bed 48 (described below) when gypsum or anhydrite is used as make-up material, and the lime reacts with and recovers any $SO_2$ liberated from bed 35, according to the empirical reaction:

$$2CaO + 2SO_2 + O_2 \rightarrow 2CaSO_4 \quad (10)$$

The heated solids from bed 38 are transferred at a suitable regulated rate via conduit 40 to oxidizer bed 35, being assisted if necessary by a suitable entraining gas (e.g. air) supplied via injector 41.

Air which is used in the oxidizer bed 35 is preheated in the bed 38. The air is passed by fan or pump 42 through heat exchange coils 43 immersed in the bed 38 before passing to a hot air main 44 and then, in part, into air conduit 136.

The hot substantially sulfur-free gases leaving the bed 38 are passed via line 46 to heat recovery and de-dusting equipment (not shown) before being discharged to atmosphere.

In order to maintain the activity of the solids in the conversion bed 13 for fixing sulfur from the fuel, some of the solids are passed to a regenerator wherein sulphur is removed therefrom. In the illustrated embodiment, solids are passed from a top region of the oxidizer bed 35 via conduit 47 to a regenerator bed 48 supported on an air distributor 49 spaced above the bottom of the containing regenerator vessel 50.

The solids in the bed 48 are fluidized by hot air from air main 44 and conduit 51, and a fuel is injected directly into the bed 48 from injector(s) 52 so as to form a non-homogeneous reducing atmosphere in the bed 48. The fuel is supplied in slight excess relative to the air input and may be any convenient fuel, but is preferably a fluid (e.g. liquid hydrocarbon) and may be unrefined. Under th non-homogeneous reducing conditions in the bed 48, the following empirical reactions occur:

$$CaSO_4 + (C) \rightarrow CaO + SO_2 + CO_x \quad (10)$$

(where $CO_x$ is a mixture of CO and $CO_2$, preferably $CO_2$).

$$CaSO_4 + (H) \rightarrow CaS + H_2O \quad (11)$$

$$3CaSO_4 + CaS \rightarrow 4CaO + 4SO_2 \quad (12)$$

The relative amounts of air and fuel are such as to maintain the temperature of bed 48 preferably in the range 950° to 1150° C. more preferably about 1050° C.

The hot gases leaving the bed 48 contain sulfur mainly in the form of $SO_2$, and the latter can be recovered for concentration as such, or for conversion to, e.g., sulfuric acid. If it is desired to recover elemental sulfur, a bed 51 of char may be provided as a fluidized layer above the regeneration bed 48 by injecting coal, coke or char into the vessel 50 either above the top of bed 48 and/or into bed 48, the following empirical reaction then occuring:

$$SO_2 + C \rightarrow CO_2 + S$$

The elemental sulfur is condensed from the hot gases leaving vessel 50 via discharge conduit 55.

Solids, including regenerated CaO, are transferred from the top region of bed 48, but below the level of any char bed 51, via conduit 56 to a bottom region of bed 35.

It will be appreciated that the embodiment as illustrated does not depict the valves and other normal regulating means and other equipment necessary for a plant according to the invention. However, the necessity for such valves, etc., and their locations will be easily determined by those skilled in the art.

Instead of transferring solids to the regenerator bed 48 from the oxidizer bed 35, solids may be transferred directly to the regenerator bed 48 from the conversion bed 13. Similarly, regenerated solids need not be returned to the oxidizer bed as illustrated, but may instead be transferred directly to the conversion bed 13. Other variations and modifications within the scope of the invention will occur to those skilled in the art. For example, if the fuel is a coal (or other fuel) which when preheated in the bed 12 is likely to evolve or liberate undesirable non-condensible substances, such as relatively low molecular weight sulfur compounds (e.g. $H_2S$ or organic sulfur compounds), it would be preferable to preheat the fuel in such a way that the gases and vapours liberated and evolved do not mix with the gas leaving the conversion bed 13. In such cases, it may be expedient to provide some lime-containing solids in the preheat bed (e.g., solids circulated from the regenerator bed and/or mixed with the fuel before it enters the preheat bed) and/or to inject the fuel directly into the conversion bed without any preheating step, or the fuel may be preheated in a separate vessel and the preheated fuel then passed to the conversion bed 13, the vapours and gases preferably being scrubbed and any materials not desired to be recovered as products injected into the conversion bed 13. Such a separate vessel may be a compartment in the vessel 11 wherein the vapour space or freeboard above the bed of fuel undergoing preheating treatment is separated from the dilute phase or freeboard above the conversion bed 13 by a wall extending downwardly from the top of the vessel 11 at least to the level of the fuel in the preheating compartment. The heat for preheating can be derived by heat recovery in any convenient manner from any one or more of the hot gas streams leaving the vessels 11, 33 and/or 50.

It will be appreciated that the method of the invention can be employed for the conversion of almost any liquid fuel and/or virtually any solid carbon-containing fuel including municipal refuse, peat, lignites, oil-shale.

The invention is now further described with reference to some examples.

EXAMPLE 1

Some preliminary experiments were performed to verify, directionally and on a rough basis, the principles used in the method of the present invention.

Experiment A—A sample of dry calcium sulfate was heated in a stream of nitrogen and the effluent gases tested. Below 900° C., there was no evidence of decomposition of the $CaSO_4$, but above this temperature, sulfur oxides were observed in amounts which increased with temperature.

Experiment B—A sample comprising a mixture of dry $CaSO_4$ and powdered wood charcoal was heated in a stream of nitrogen, and the effluent gases tested. It was observed that at a temperature of 450° C., the volume of effluent gas was slightly greater than that of the nitrogen input gas measured at the same conditions. Tests with Draeger tubes indicated that the additional gas comprised a trace of $SO_2$, and carbon oxides (mainly $CO_2$ with a small proportion of CO). As the temperature was progressively increased, the effluent gas was found to comprise $SO_2$ and carbon oxides in which the proportion of $CO/CO_2$ increased with increasing temperature. Nevertheless, the total amount of effluent gas was only very slightly greater e.g. about 10% at 850° C. than the total amount of nitrogen input gas suggesting that the chemical reactions were kinetically limited.

Experiment C—Experiment B was repeated, but when the temperature of the mixture, as indicated by a single thermocouple immersed therein, attained 850° C., the supply of nitrogen was interrupted and replaced by hydrogen. Due to the fact that the experimental equipment contained a considerable volume of nitrogen, the effect of the hydrogen was not expected to be apparent for some time, notwithstanding the fact that hydrogen diffuses very rapidly. Contrary to this expectation, the hydrogen exerted a dramatic influence on the reaction in that 2 minutes after hydrogen had been introduced, and with the sample's temperature (as measured) being about 876° C., the volume of effluent gas was 285% of that of the input gas, and the effluent gas contained more than 4.0 vol % CO, and more than 20 vol % $CO_2$ and no sulfur dioxide or $H_2S$, the balance being mainly nitrogen, and a small amount of hydrogen. The exact amounts of CO and $CO_2$ could not be determined because they were in excess of the maximum which could be measured with the equipment employed (Draeger tubes). With the passage of time, the amount of nitrogen in the effluent gases diminished as expected and the amount of hydrogen increased. The maximum rate of reaction, based on the rate of generation of reaction product gases, was at a measured temperature of 932° C. when the effluent gas had a volume 386% of that of the input (hydrogen) gas. The reaction continued passed this temperature, but tended to diminish presumably because the $CaSO_4$ had been as fully reduced as was possible in the circumstances.

Samples of the product gas were taken in intervals in plastic bags, and the following approximate analyses were obtained by gas chromatography:

to a product gas which was substantially free of inert diluents such as nitrogen and contaminants such as sulfur moieties. Moreover, the $CO/CO_2$ ratio of the product gas was relatively high.

EXAMPLE 2

Experiments were conducted using equipment corresponding to (1) the vessel 11 but having only conversion bed 13 in the lower part and no pre-heat bed 12 and (2) the vessel 33 but having only the oxidizer bed 35 in the lower part and no heat recovery bed 38. The equipment used for the experiments was adapted from available equipment designed for a different process, and fell considerably short of the desirable requirements for the process of the invention. For example, the cross-sectional plan areas of the vessel 11 to vessel 33 were in the ratio of 1 to 9.4 (approximately) whereas a more desirable ratio of areas would have been approximately 1 to 1.5 or less. In addition, the solids transfer system, although similar in principle to that described and shown in the drawing comprising the conduits 32 and 37, was designed to provide a relatively low solids circulation rate in both directions between the beds 13 and 35 whereas the requirements for the process of the invention include a relatively high solids circulation rate between the beds 13 and 35. Solids transfer for the experiments was achieved by the injection of nitrogen as a propellant at the lower end of each of the conduits 32 and 37, the nitrogen injected into conduit 37 being supplemented by a small amount of cooled, water-scrubbed product gas. In a plant particularly designed for the process of the invention, the injection of a diluent gas such as nitrogen to cause solids circulation would be avoided unless the quantities were very small in relation to the amounts of gas product generated, and it would generally be desirable to employ recycled product gas and/or steam. Moreover, the form of the conduits 32, 37 and their exits and entrances would be such as to permit considerably greater solids circulation rates commensurate with the requirements for the process of the invention.

Notwithstanding the considerable drawbacks of the equipment, the experiments gave results which were decidedly encouraging.

The fuel employed was a heavy fuel oil (Bunker C) having a sulfur content of 3.41 wt. % and a specific gravity of about 1.0.

The bed 13 was approximately cylindrical with an average diameter of about 20 cms and a depth, during operation, of about 95 cms, and contained about 35 kg. of particles. The bed 35 was approximately cylindrical with an average diameter of about 61 cms and a depth,

| Gas Sample No. | Time, Mins (Note 1) | Temperature °C. (Note 2) | Gas Composition (vol %, dry basis) | | | | | |
|---|---|---|---|---|---|---|---|---|
| | | | $H_2$ | $O_2$* | $N_2$* | $CH_4$ | CO | $CO_2$ |
| 1 | 4 to 8 | 888 to 910 | 1.04 | 0.20 | 31.92 | 1.23 | 40.70 | 24.91 |
| 2 | 20 to 24 | 942 to 948 | 10.94 | 0.15 | 1.39 | 0.19 | 60.86 | 26.47 |
| 3 | 28 to 32 | 952 to 958 | 16.37 | 0.20 | 1.02 | 0.50 | 64.78 | 17.32 |

*As the samples were produced under net reducing conditions, the oxygen and some nitrogen must have been a contaminant derived from residual air present in the sampling and analysis systems.
Notes:
(1) The time was measured from the instant that nitrogen flow was interrupted and replaced by hydrogen.
(2) The temperature readings are those corresponding to the times at the beginning and ending of the sampling.

Although the results obtained from Experiment C were not precise, they confirmed that a solid fuel (wood charcoal in this instance) could be efficiently oxidized by a reducible oxygen-containing solid (e.g. $CaSO_4$) in the presence of a mediator for oxygen transfer (e.g. $H_2$)

during operation, of about 95 cms, and contained about 260 kg. of particles. The particles were circulated at a rate of about 1275 kg/hr from one bed to the other by the injection into the lower end of conduit 37 of a mixture approximately comprising 12 vol % nitrogen and 88 vol % cleaned, cooled product gas at a rate, at steady state conditions, of about 121 liters per minute (referred to 760 mm Hg pressure and 0° C. temperature), and of nitrogen into the lower end of conduit 32. At steady state conditions, the particles circulated from the bed 35 to the bed 13 had an approximate composition of about 20 wt. % $CaSO_4$, the remainder being mainly CaO with about 2.5 wt. % MgO and minor amounts of contaminants such as alumina and silica. Calculations showed that only about 1.0 wt. % of $CaSO_4$ was required for the oxidation of the fuel under the range of the experimental conditions. The excess of $CaSO_4$ was not considered to be disadvantageous.

As mentioned above, the relative sizes of the beds 13 and 35 were far from the desired range, and because the bed 35 was excessively large, some difficulties were unavoidable in maintaining its temperature without supplementary heat to augment the exothermic oxidation of the CaS to $CaSO_4$ therein. The main reason for these difficulties arose from the fact that the air used to fluidize the excessive amount of particles in the oversized bed 35 had to be greatly in excess of the air requirement for the exothermic oxidation, and much of the heat of the process was lost in the oxygen-depleted air leaving the top of the head 35. In addition, heat was lost by conduction and convection from the walls of the excessively large vessel 33 containing the bed 35. The temperature of the bed 35 was therefore maintained at about the desired value by burning in the bed 35 sufficient cleaned product gas obtained by the conversion of the fuel oil in the bed 13, and when necessary, by additionally burning appropriate amounts of the fuel oil in the bed 13. It should be understood that with correctly sized equipment designed for the process of this invention, no supplement of heat to the bed 35 would be necessary since the exothermic oxidation of CaS to $CaSO_4$ would, in those circumstances, provide at least sufficient heat to maintain the temperature of bed 35 in the desired operating range.

The product gas leaving bed 13 was scrubbed by passage with cold water through a venturi mixer to remove tars and entrained solids. The scrubbing process entailed an additional heat loss which was acceptable for the experiments, but which would normally be avoided in a commercial application of the invention.

The fuel oil was injected into the bed 13 from a single nozzle at a height of 34.6 cms above the distributor 17. The nozzle, corresponding to the injector pipe 15, was disposed on the opposite side of the bed 13 from the openings of the ducts 32 and 37 and was in a vertical diametrical plane approximately bisecting the angle defined by the vertical diametrical planes containing the said openings of the ducts 32 and 37.

For safety reasons, a continuous purge of nitrogen gas was passed into the bed 13 via line 18 so that in the event of an equipment failure, the time taken to purge the vessels and environs of toxic and inflammable gases would be relatively low.

Four test runs were completed, the first being at a relatively low oil/$CaSO_4$ rate and each subsequent test being at a higher oil/$CaSO_4$ rate, and the results are shown in the following Table. All gas volumes are given at 760 mm Hg pressure and 0° C.

TABLE

| | Run No. | 1 | 2 | 3 | 4 |
|---|---|---|---|---|---|
| 1. | | | | | |
| 2. | Oil Rate, Kg/hr | 3.00 | 3.56 | 4.41 | 5.64 |
| 3. | Product Gas Recycled to Bed 13 (liters/min) | 319 | 320 | 327 | 308 |
| 4. | Nitrogen Passed into Bed 13 (liters/min) | | | | |
| (a) | Purge via line 18 | 44.1 | 44.1 | 44.1 | 44.1 |
| (b) | Via line 15 | 14.4 | 14.4 | 14.4 | 14.4 |
| (c) | Total | 58.5 | 58.5 | 58.5 | 58.5 |
| 5. | Depth of Bed 13 (cms) | 98.0 | 95.5 | 92.4 | 93.7 |
| 6. | Temperature of Bed 13, °C. | 925.9 | 916.7 | 908.8 | 894.0 |
| 7. | Temperature of Bed 35, °C. | 1001.2 ± 0.5 | 999.6 ± 1.1 | 1001.7 ± 0.7 | 1001.2 ± 0.7 |
| 8. | Temperature of Recycled Gas in Line 30, °C. | 78 | 80 | 82 | 83 |
| 9. | Particles Circulation Rate (line 32 or line 37) Kg/hr | 1278 | 1278 | 1278 | 1278 |
| 10. | Product Gas Rate, line 26, liters/min | 126.8 | 155.0 | 170 | 181 |
| 11. | Product Gas Analysis, Vol % dry (not including $H_2S$) | | | | |
| | $H_2$ | 4.16 ± 0.21 | 6.91 ± 0.35 | 8.65 ± 0.43 | 10.83 ± 0.48 |
| | $N_2$ + Inerts | 46.31 ± 0.93 | 37.83 ± 0.76 | 34.30 ± 0.69 | 32.42 ± 0.65 |
| | $CH_4$ | 3.0 ± 0.08 | 5.25 ± 0.13 | 7.44 ± 0.19 | 10.03 ± 0.23 |
| | $CO_2$ | 36.70 ± 0.92 | 34.83 ± 0.87 | 30.62 ± 0.77 | 24.06 ± 0.63 |
| | $C_2H_4$ | 0.82 ± 0.16 | 1.48 ± 0.30 | 2.03 ± 0.37 | 3.04 ± 0.25 |
| | $C_2H_6$ | 0.07 ± 0.01 | 0.13 ± 0.03 | 0.17 ± 0.03 | 0.30 ± 0.03 |
| | CO | 8.95 ± 0.22 | 13.58 ± 0.34 | 16.79 ± 0.42 | 19.33 ± 0.48 |
| 12. | Approximate $H_2S$ (by Draeger tube) | 0.32 ± 0.06 | 0.32 ± 0.6 | 0.15 ± .04 | 0.15 ± .04 |
| 13. | Specific Gravity (air = 1.0) | 1.12 ± 0.05 | 1.07 ± 0.05 | 1.03 ± 0.05 | 0.96 ± 0.05 |
| 14. | $CO/CO_2$ Ratio | 0.24 | 0.39 | 0.55 | 0.80 |
| 15. | Gross Calorific value, $Kcal/m^3$ | 1410 | 2420 | 3138 | 4130 |
| 16 | $N_2$ - Free Gas Product Rate, liters/Kg oil | 1370 | 1620 | 1557 | 1320 |
| 17 | Stone Circulated kg/kg Oil | 430 ± 30 | 360 ± 20 | 290 ± 15 | 230 ± 5 |
| 18 | Oxygen from Calcium Sulphate, kg/hr | 4.06 | 5.54 | 5.72 | 5.24 |

TABLE-continued

| | Run No. | 1 | 2 | 3 | 4 |
|---|---|---|---|---|---|
| 19 | Oxygen from Calcium Sulphate, kg/kg Oil | 1.36 ± 0.11 | 1.56 ± 0.10 | 1.30 ± 0.08 | 0.93 |
| 20 | Sulphur fed to bed 13 (oil @ 3.41%S), kg/hr | 0.100 | 0.123 | 0.150 | 0.191 |
| 21 | Sulphur out as $H_2S$ in Product Gas, kg/hr | 0.0363 | 0.0409 | 0.0273 | 0.0273 |
| 22 | Sulphur Fixed in Bed 13, wt. % | 36 ± 9 | 33 ± 7 | 18 ± 3 | 14 ± 3 |
| 23 | Oil Conversion Rate | | | | |
| (a) | lb/ft$^2$/hr | 21 ± 1 | 26 ± 1 | 32 ± 1 | 40 ± 2 |
| (b) | kg/cm$^2$/hr (X10-4) | 4.31 | 5.33 | 6.56 | 8.20 |
| 24 | Heat of Reaction | | | | |
| (a) | BTU/lb oil | 6200 ± 600 | 6200 ± 600 | 6100 ± 500 | 6000 ± 500 |
| (b) | Kcal/kg oil | 8960 | 8960 | 9100 | 9260 |

The foregoing data clearly demonstrate that the method of the invention can be employed for the efficient gasification of fuels to produce a fuel gas of high calorific value and high purity suitable for use as a fuel or as a synthesis gas for use in the production of hydrocarbons, alcohols and other industrial chemicals.

What is claimed is:

1. A method of converting liquid hydrocarbon fuel and/or solid carbonaceous fuel to a substantially inerts-free reducing and/or synthesis gas product, said method comprising:
   (a) passing the fuel into a fuel conversion zone comprising a conversion bed of solid particles which are maintained at an elevated fuel conversion temperature and fluidized by a fluidizing gas which is paased into the bottom of the conversion bed, the conversion bed containing solid particles comprising calcium sulfate which constitutes substantially the sole source of oxygen used in the conversion of the fuel, the fluidizing gas comprising at least one gas phase and/or vapour phase substance which serves to promote and/or mediate the transfer of oxygen to the fuel and/or to partially converted fuel derivatives from the calcium sulfate, which is thereby reduced to calcium sulfide whereby a substantially inerts-free reducing and/or synthesis product gas leaves the top level of the conversion bed, the fluidizing gas being substantially free of molecular oxygen and unreactive and/or inert materials which would dilute the gas product;
   (b) transferring solid particles containing calcium sulfide from the fuel conversion zone to an oxidizer bed in an oxidation zone and passing into the bottom of the oxidizer bed a gas containing molecular oxygen at a rate sufficient to fluidize the solid particles in the oxidation bed and to oxidize the calcium sulfide in said solid particles to form said calcium sulfate with the generation of heat which maintains the temperature of particles in the oxidizer bed higher than the temperature of particles in the conversion bed; and
   (c) transferring the solid particles comprising said calcium sulfate from the oxidizer bed to the conversion bed for use in converting further quantities of fuel in the conversion bed, the solid particles thus transferred to the conversion bed furnishing at least some heat for maintaining the conversion bed at the said elevation fuel conversion temperature.

2. The method of claim 1 in which the said gas phase and/or vapour phase mediating substance in the fluidizing gas passed into the bottom of the fuel conversion bed is selected from hydrogen, a compound which serves as a source of hydrogen under the fuel conversion conditions in the fuel conversion bed, at least one oxide of carbon, and a mixture of at least two of the foregoing.

3. The method of claim 1 in which at least some of the fluidizing gas passed into the fuel conversion bed comprises part of the product gas.

4. The method of claim 1 in which the product gas leaving the top of the conversion bed is subjected to a cleaning process to separate and recover condensible materials therefrom, and in which at least some of said condensible materials are passed to the conversion bed for use as fuel therein.

5. The method of claim 1 in which at least some of the fluidizing gas passed into the conversion bed comprises part of the product gas from which condensible materials have been separated and recovered.

6. The method of claim 1 in which the solid oxidizable material is calcium sulfide and the conditions of operation of the oxidation bed are such that substantially none of the calcium sulfide is converted to calcium oxide and substantially no sulfur oxide leaves the top level of the oxidation bed.

7. The method of claim 1 in which the conversion bed contains solid particles comprising at least one solid compound which reacts chemically with at least one moiety in the fuel whose presence is undesirable in the product gas to form at least one solid compound containing the undesirable moiety.

8. The method of claim 7 in which particles from the fuel conversion zone are treated in a regeneration zone under regeneration conditions to regenerate the solid compound containing the undesirable moiety by removing at least some of said undesirable moiety therefrom, and at least some of the treated particles are returned directly and/or indirectly to the conversion bed for re-use in reacting with further quantities of undesirable moiety from fuel undergoing conversion in the conversion bed.

9. The method of claim 8 in which a moiety in the fuel whose presence of the product gas is undesirable comprises sulfur, and in which the solid compound which reacts with the sulfur in the conversion bed comprises calcium oxide.

* * * * *

UNITED STATES PATENT AND TRADEMARK OFFICE
CERTIFICATE OF CORRECTION

PATENT NO. : 4,309,198
DATED : January 5, 1982
INVENTOR(S) : Gerald Moss

It is certified that error appears in the above—identified patent and that said Letters Patent is hereby corrected as shown below:

Column 9, line 46 "passed" should be --past--.

Column 11, line 35, the designation "1." should be on line 34, immediately above, preceding the term "Run No."

Column 14, lines 38 and 39, delete "the solid oxidizable material is calcium sulfide and"

Signed and Sealed this

Fifth Day of October 1982

[SEAL]

Attest:

*Attesting Officer*

GERALD J. MOSSINGHOFF
*Commissioner of Patents and Trademarks*